United States Patent [19]

Solovay

[11] Patent Number: 4,979,759
[45] Date of Patent: Dec. 25, 1990

[54] FREE-STANDING BIKE STAND

[76] Inventor: Michael Solovay, 24412 Blue Sky Ct., West Hills, Calif. 91307

[21] Appl. No.: 371,173

[22] Filed: Jun. 23, 1989

[51] Int. Cl.$^5$ .............................................. B62H 3/00
[52] U.S. Cl. ..................................... 280/293; 211/17; 211/22; 248/166; 248/175
[58] Field of Search ................ 280/293; 248/166, 175, 248/352; 211/17, 22, 178

[56] References Cited

U.S. PATENT DOCUMENTS

| D. 152,688 | 2/1949 | Hammond | 248/175 X |
| 506,600 | 10/1893 | Marks | 280/293 |
| 518,325 | 4/1894 | Mueller | 280/293 X |
| 556,758 | 3/1896 | Lefebre, Jr. | 248/175 |
| 1,241,486 | 10/1917 | Armstrong | 248/175 |
| 2,461,374 | 2/1949 | Custer | 248/175 |
| 2,805,062 | 9/1957 | Holmes | 248/166 |
| 3,054,588 | 9/1962 | Ondrasik | 248/175 |
| 3,532,225 | 10/1970 | Reed | 248/175 |
| 3,712,637 | 1/1973 | Townsend | 280/293 |
| 3,910,603 | 10/1975 | Shipman | 280/293 |
| 3,980,320 | 9/1976 | Marchello | 280/293 |
| 4,474,387 | 10/1984 | Maranell et al. | 280/293 |
| 4,563,016 | 1/1986 | Holleron, Jr. | 280/293 |
| 4,591,180 | 5/1986 | Copple | 280/293 |
| 4,773,665 | 9/1988 | Hindle | 280/293 |

FOREIGN PATENT DOCUMENTS 2545405 11/1984 France ................................. 280/293
17554 of 1897 United Kingdom ................. 211/22

Primary Examiner—Mitchell J. Hill
Attorney, Agent, or Firm—John J. Posta, Jr.

[57] ABSTRACT

The bike stand is free-standing and separate from the bike. The stand includes a horizontal base or bottom portion, an about vertical middle portion, preferably conected to the front end of the bottom portion and an upper bike supporting portion connected to the middle portion. The upper portion includes a pair of laterally spaced rearwardly extending L-shaped arms connected at their upper ends by a cross-bar. The lower rungs of the arms support the bicycle or motorbike, for example, the tubular bottom portion of a motorbike frame.

2 Claims, 2 Drawing Sheets

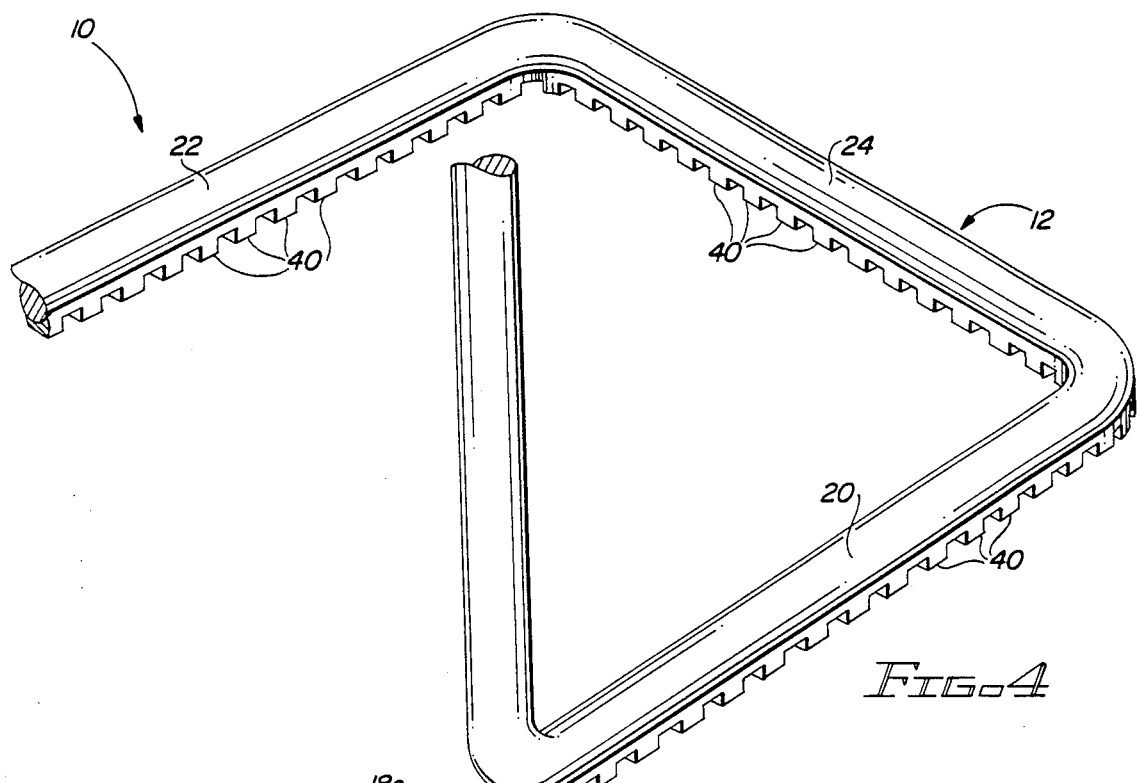
Fig. 4
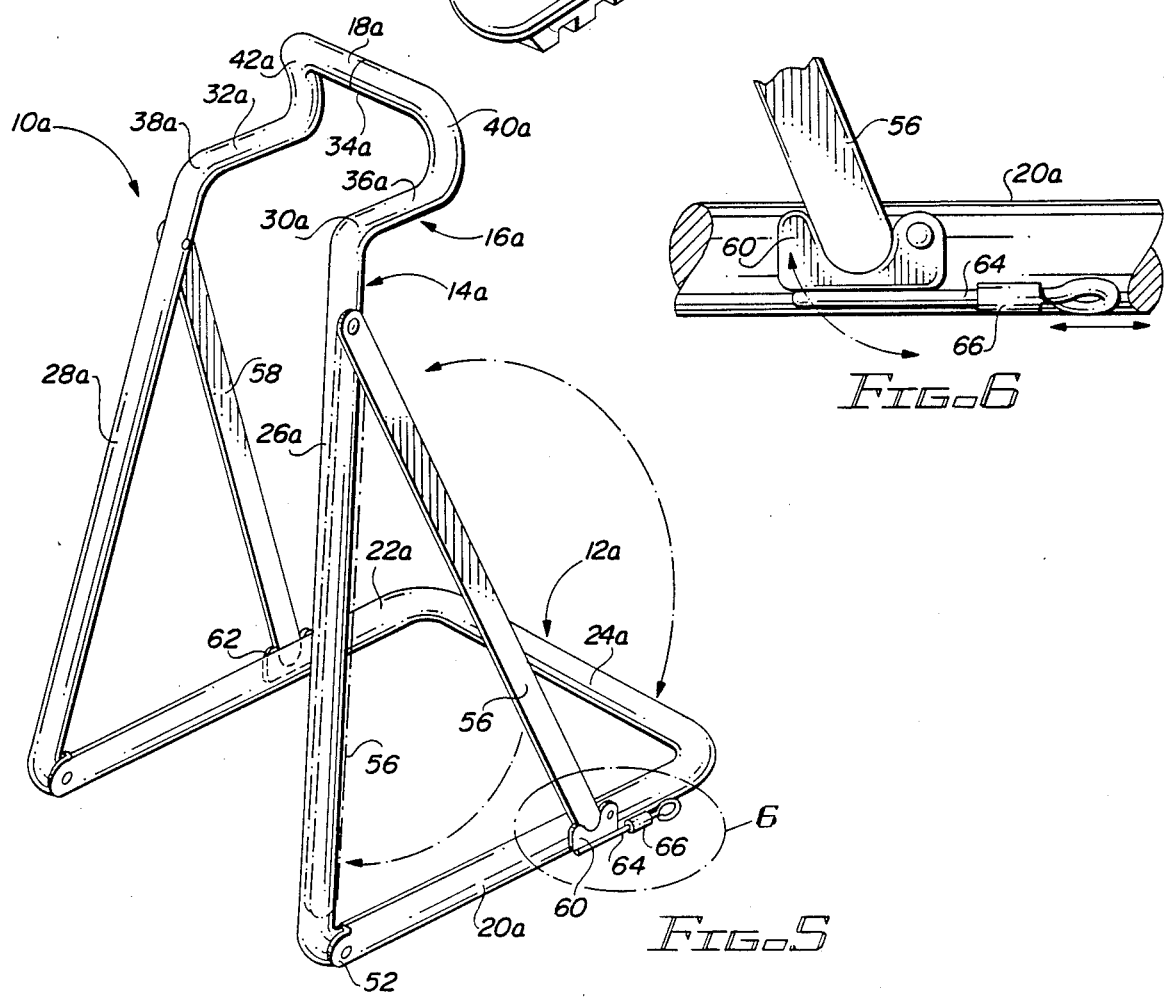
Fig. 5
Fig. 6

FREE-STANDING BIKE STAND

BACKGROUND OF THE INVENTION

1. Field of the Invention

The present invention generally relates to support means and more particularly to an improved free-standing bicycle and motorbike stand.

2. Prior Art

Various types of stands have been designed and constructed to releasably hold bicycles and motorbikes, such as motorcycles in desired about upright positions. Most of such devices are permanently connected to and carried on the bicycle and/or motorbike. Usually, they are hinged to the bike frame and swing out and/or down when needed to be used. See, for example, the stands shown in U.S. Pat. Nos. 506,600, 3,712,637, 8,910,603, 3,980,320, 4,563,016, 4,773,665, and 4,591,180. Such stands have the disadvantage of being heavy, and expensive and of taking up valuable space on the bicycle or motorbike frame. Moreover, they are subject to fouling with road grime and of obstructing the proper use and operation of the bicycle or motorbike.

Separate free-standing stands not connected to the bicycle or motorbike are much less common and usually very bulky fixed devices not intended to be moved. See, for example, U.S. Pat. No. 518,325, directed to a heavy cumbersome and complicated bicycle stand which is non-portable and which has a central slot into which a bicycle is driven and thereafter connected to the stand to immobilize the bicycle. Such a stand would, in any event, not be useful for motorbikes of various widths and weights and sizes.

There remains a need for a simple, inexpensive, sturdy, free-standing bicycle and motorbike stand which is also portable. The stand should enable the bicycle or motorbike rider to use it without any particular difficulty or effort. Ideally, the rider should be able to ride directly up to the stand, stop, get off and walk away, with the stand automatically holding the bike in the desired about upright position.

SUMMARY OF THE INVENTION

The improved free-standing, portable bike stand of the present invention satisfies all the foregoing needs. The stand is substantially as set forth in the Abstract of the Disclosure.

Thus, the stand is preferably of unitary one-piece, sturdy, light weight construction. It can be fabricated of a single piece of steel or other metal tubing, with the opposite ends thereof welded or brazed together. It can also be formed in other ways, of one or a plurality of interconnected components of metal or other sturdy material.

The stand comprises a horizontal base or bottom portion, an upraised middle portion connected to the front end of the bottom portion, and an upper bike-supporting portion. The bottom portion may, for example, be a U-shaped tube in plan view, and the middle portion may be, for example, about a pair of about vertical, upwardly converging tubes integrally connected to the free front ends of the bottom portion tube. Preferably, the middle portion leans slightly rearwardly over the bottom portion and terminates at its upper end in a pair of rearwardly extending L shaped arms bridged at their upper ends by a cross-bar. Thus, all three portions, bottom, middle and upper, can be tubular for the lightest weight and greatest strength. Since the stand can be made small enough to fit under the tubular bottom portion of the bike frame, it can be easily transported and stored in a pouch or the like.

In one embodiment, the bottom of the stand has road-gripping treads In another embodiment, the stand can be folded for transportation and storage and can be easily deployed for use. It can include support struts and the like.

Further features of the invention are set forth in the following detailed description and accompanying drawings.

DRAWINGS

FIG. 4 is an enlarged fragmentary schematic side perspective of the bottom portion of the stand of FIG. 1, with a bottom anti-skid tread connected thereto;

FIG. 5 is a schematic side perspective, partly broken away, of a second preferred embodiment of the improved bike stand of the present invention; and, FIG. 6 is an enlarged schematic side elevation of the strut lock utilized in the stand of FIG. 5.

DETAILED DESCRIPTION

FIGS. 1-3

A first preferred embodiment of the improved bike stand of the present invention is schematically depicted in FIGS. 1-8.

Figure 1:
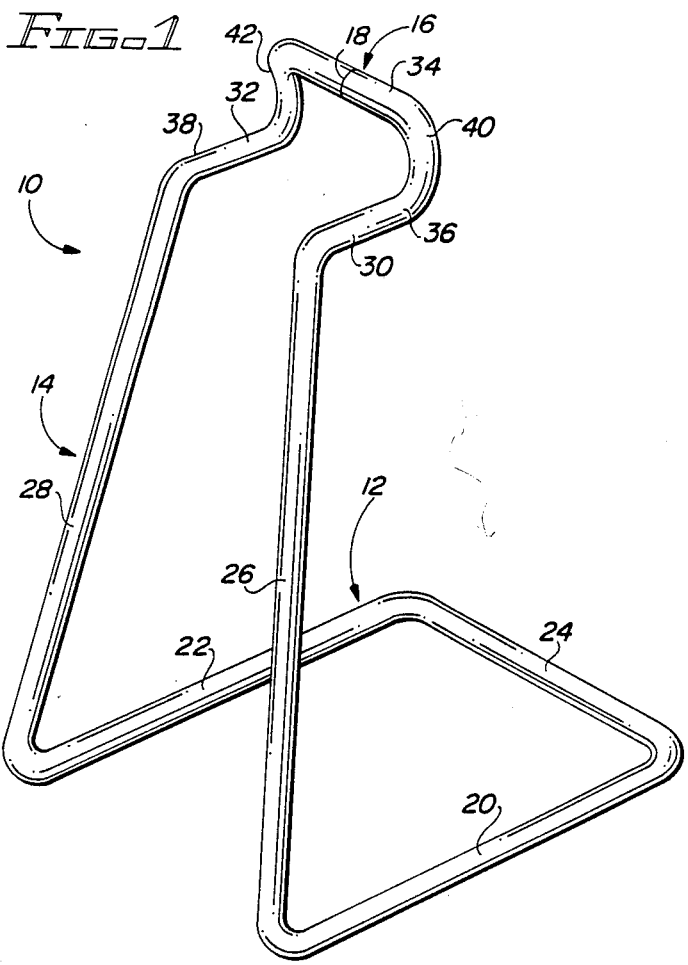
FIG. 1 is a schematic side perspective view of a first preferred embodiment of the improved bike stand of the present invention.

Thus, stand 10 is shown, which comprises a horizontal bottom support portion 12 integrally connected to an about vertical middle portion 14, in turn integrally connected to an upper bike frame-supporting portion 16. Preferably, stand 10 is fabricated of a single piece of lightweight, strong, hollow metal tubing such as steel or stainless steel, the opposite ends of which are welded or brazed together, for example, at point 18, as shown in FIG. 1. Stand 10 may be any suitable size, for example, about 13 inches high, including a 1 inch middle portion 14 and a 2 inch upper portion 16 and may weigh, for example, about 1 lb. or so. Bottom portion 12 may be, for example, about 7 inches deep and about 5 inches wide.

Figure 2:
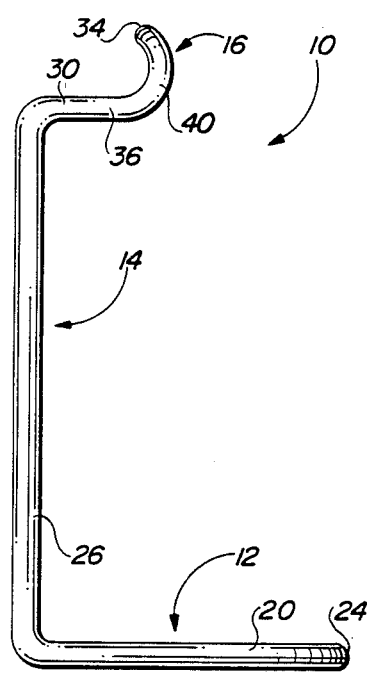
FIG. 2 is a schematic side elevation of the stand of FIG. 1.
Figure 3:
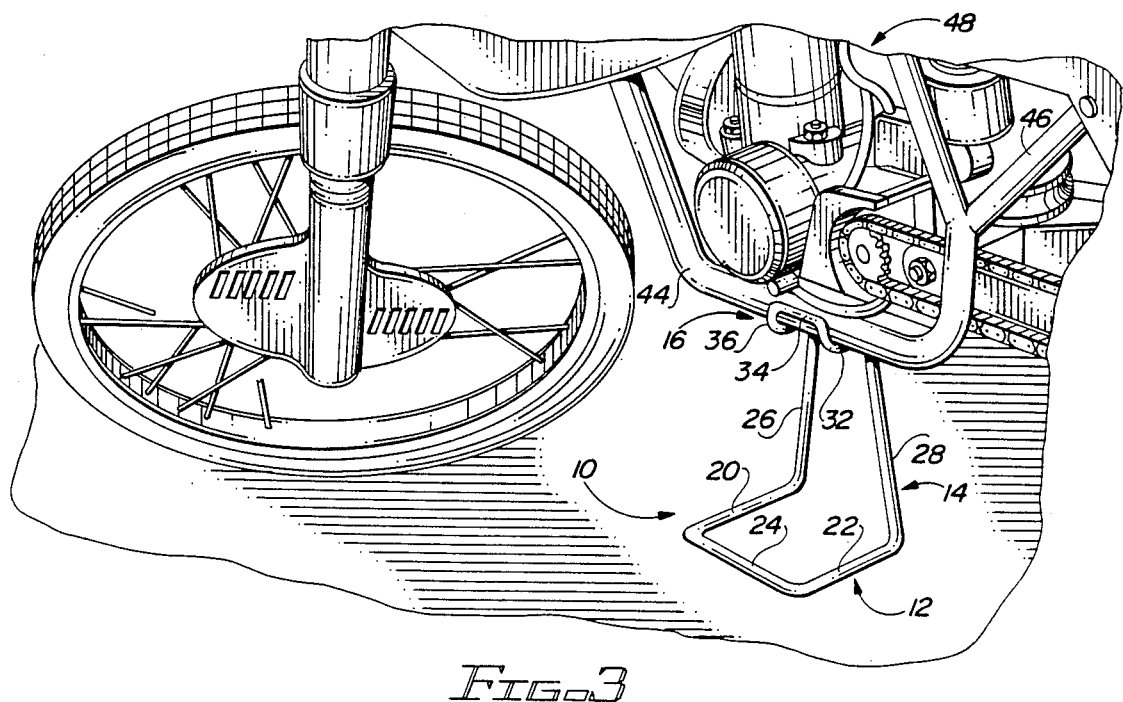
FIG. 3 is a schematic side perspective view of the stand of FIG. 1 shown holding a motorbike in an about upright position.

In FIGS. 1-3, bottom portion 12 is shown as being a single piece of tubing bent into the form of an open rectangle, comprising integral sides 20 and 22 and rear cross connector 24. Sides 20 and 22 at their front ends are integral with an about vertical transversely spaced upwardly converging pair of tubes 26 and 28, which preferably tilt slightly rearwardly over lower portion 12 for greater stability. Tubes 26 and 28 are integral at their upper ends with rearwardly extending transversely spaced L-shaped tube arms 30 and 32, respectively, bridged at their upper ends by a transverse cross bar 34.

Arms 30 and 32 have generally horizontal, bike frame-supporting lower rings or limbs 36 and 38, respectively, and generally vertical upper rings or limbs 40 and 42, respectively. Rungs 36 and 38 may be sloped slightly downwardly forwardly and rounded at their points of connection with tubes 26 and 28, respectively, to facilitate sliding the lower portion 44 of a bike frame 46, such as that of motorbike 48 (FIG. 3) over rungs 36 and 38 when placing bike 48 on stand 10. Tubes 26 and 28 are made short enough to properly position rungs 36 and 38 below frame 46.

The points of connection of the upper and lower rungs of arms 30 and 38 can also be rounded to avoid binding with frame 46 and to provide a smooth symmetrical appearance.

Stand 10 can, if desired, be carried in a pouch or the like on bike 48 and deployed on the ground as or after bike 48 stops, enabling the rider to get off and tilt bike 48 sideways into engagement on and support by rungs 36 and 38 and then walk away. Thus, bike 48 is easily and safely kept in an about upright position. Bike 48 can later be tilted upright and after withdrawing and storing stand 10. Alternatively, stand 10 can be left in place on the ground. Accordingly, stand 10 is small, compact, light weight, inexpensive, durable and efficient.

FIG. 4

FIG. 4 shows bottom portion 12 of stand 10 modified by the addition to its underside of anti-skid treads 40 of rubber, metal, a carbide composite, or the like, which may be bolted, cemented or otherwise secured thereto. Treads 40 prevent 10 from slipping when placed on a smooth surface such as a smooth concrete roadway or the like (not shown).

FIGS. 5 and 6

A second preferred embodiment of the improved bike stand of the present invention is schematically depicted in FIGS. 5 and 6. Thus, bike stand 10a is shown. Components thereof similar to those of stand 10 of FIGS. 1-4, bear the same numerals but are succeeded by the letter "a".

Stand 10a is identical to stand 10, except as follows:

(a) the lower ends of tubes 26a and 28a are hinged to tubes 20a and 22a, respectively, and bear bottom hinge limit plates 52 and 54 projecting below tubes 20a and 22a, respectively, and which limit the relative opening of the angle between portions 12a and 14a to the about right angle shown in FIG. 5;

(b) support struts 56 and 58 are hinged to legs 26a and 28a, respectively, to brace and releasably hold tubes 26a and 28a in the operative position and for this purpose are received in strut locks 60 and 62 on tubes 20a and 22a, respectively. Locks 60 and 62 are U-shaped and hinged on one side in order to freely rotate downwardly and out of the way of struts 56 and 58, except when releasably held in a horizontal position by pins 64 sliding under locks 60 and 62 in collars 66 affixed to the sides of respective tubes 20a and 22a; and, (c) stand 10a folds to an unusually flat and compact storage and carrying position with portion 12a abutting portion 14a and struts 56 and 58 generally parallel to tubes 26a and 28a.

Stand 10a has the other advantages of stand 10 and can be fabricated of similar materials.

Various other modifications, changes, alterations and additions can be made in the improved bike stand of the present invention, its components and parameters. All such modifications, changes, alterations and additions as are within the scope of the appended claims form part of the present invention.

What is claimed is:

1. An improved free-standing, portable bike stand, said stand comprising a self-standing unitary body having a generally horizontal bottom support portion, an upraised middle portion connected to said bottom portion and an upper bike frame-holding portion connected to said middle portion, said upper portion comprising a spaced pair of rearwardly extending L-shaped arms joined at about the upper ends thereof by a cross-bar and adapted to releasably receive the frame tubing of a bike for releasably holding the bike in an about upright position, wherein said stand is adapted for use with a motor bike and said bottom portion comprises a spaced pair of rearwardly extending horizontal legs interconnected by a cross-bar, and said middle portion comprises a spaced pair of about vertical upwardly converging tubular legs, wherein said middle portion tilts rearwardly so that said middle portion and said upper portion are over said bottom portion, and wherein each of said L-shaped arms comprises a rearwardly substantially horizontal lower bike frame-supporting rung and a substantially vertical upper rung, said rungs having a curved intersection to prevent binding with a bike frame and to facilitate storage of said stand.

2. The improved bike stand of claim 1 wherein the bottom portion bears road surface-gripping means.

* * * * *